US011624353B2

(12) United States Patent
Nielsen et al.

(10) Patent No.: US 11,624,353 B2
(45) Date of Patent: Apr. 11, 2023

(54) INSTALLATION OF CABLES AND OTHER COMPONENTS IN A WIND TURBINE TOWER

(71) Applicant: Vestas Wind Systems A/S, Aarhus N (DK)

(72) Inventors: Martin Werner Nielsen, Svenstrup J (DK); Børge Øllgaard, Esbjerg (DK)

(73) Assignee: Vestas Wind Systems A/S, Aarhus N (DK)

(*) Notice: Subject to any disclaimer, the term of this patent is extended or adjusted under 35 U.S.C. 154(b) by 0 days.

(21) Appl. No.: 17/779,756

(22) PCT Filed: Nov. 26, 2020

(86) PCT No.: PCT/DK2020/050336
§ 371 (c)(1),
(2) Date: May 25, 2022

(87) PCT Pub. No.: WO2021/104598
PCT Pub. Date: Jun. 3, 2021

(65) Prior Publication Data
US 2022/0403828 A1 Dec. 22, 2022

(30) Foreign Application Priority Data
Nov. 26, 2019 (EP) .................................. 19211673

(51) Int. Cl.
*F03D 80/80* (2016.01)
*F03D 13/40* (2016.01)

(52) U.S. Cl.
CPC ............. *F03D 80/85* (2016.05); *F03D 13/40* (2016.05); *F05B 2230/61* (2013.01);
(Continued)

(58) Field of Classification Search
CPC ...... F03D 80/85; F03D 13/40; F05B 2240/85; F05B 2230/61; F05B 2240/912; F05B 2260/30
See application file for complete search history.

(56) References Cited

U.S. PATENT DOCUMENTS

| 8,939,299 B2 | 1/2015 | Ahler et al. |
| 2003/0066453 A1 | 4/2003 | Cylvick |

(Continued)

FOREIGN PATENT DOCUMENTS

| CN | 101983287 A | 3/2011 |
| CN | 111502922 A | 8/2020 |

(Continued)

OTHER PUBLICATIONS

European Patent Office, Extended Search Report in EP Application No. 19211673.9, dated May 29, 2020.
(Continued)

*Primary Examiner* — Aaron R Eastman
(74) *Attorney, Agent, or Firm* — Wood Herron & Evans LLP

(57) ABSTRACT

A new method for installing one or more electric cables (60) in a wind turbine tower section (100) is provided. The method comprises providing the wind turbine tower section (100) in a substantially horizontal orientation and installing a zip line (20) inside the wind turbine tower section (100), between a first end (120) and a second end (130) of the wind turbine tower section (100). The method further comprises coupling a second end of the electric cables (60) to the zip line (20) at a location near the first end of the wind turbine tower section (100), drawing the second end of the electric cables (60) through the wind turbine tower section (100) along the zip line (20), decoupling the second end of the electric cables (60) from the zip line (20), and removing the zip line (20) from the wind turbine tower section (100). The (Continued)

method further comprises anchoring a first end of the electric cables (60) to the wind turbine tower section (100), at a location adjacent the first end of the wind turbine tower section (100), and anchoring the second end of the electric cables (60) to the wind turbine tower section (100), at a location adjacent the second end of the wind turbine tower section (100).

16 Claims, 5 Drawing Sheets

(52) U.S. Cl.
CPC ..... *F05B 2240/85* (2020.08); *F05B 2240/912* (2013.01); *F05B 2260/30* (2013.01)

(56) References Cited

U.S. PATENT DOCUMENTS

| 2020/0248675 | A1 | 8/2020 | Kjaer Blaabjerg et al. |
| 2020/0284315 | A1 | 9/2020 | Rumler et al. |
| 2020/0412112 | A1* | 12/2020 | Van Hinsbergh ....... F03D 80/85 |
| 2021/0317813 | A1 | 10/2021 | Schomacker et al. |
| 2022/0025873 | A1 | 1/2022 | Hansen et al. |
| 2022/0186715 | A1 | 6/2022 | Blaabjerg et al. |

FOREIGN PATENT DOCUMENTS

| CN | 111664059 A | 9/2020 |
| CN | 113015851 A | 6/2021 |
| CN | 113366215 A | 9/2021 |
| CN | 113508228 A | 10/2021 |
| EP | 3257562 A1 | 12/2017 |
| EP | 3502533 A1 | 6/2019 |
| GB | 2513387 A | 10/2014 |
| GB | 2561260 A | 10/2018 |
| JP | 2016181967 A | 10/2016 |
| JP | 2019157616 A | 9/2019 |
| WO | 2013050451 A2 | 4/2013 |
| WO | 201382199 A1 | 6/2013 |
| WO | 2013182199 A1 | 12/2013 |

OTHER PUBLICATIONS

European Patent Office, International Search Report and Written Opinion in PCT Application No. PCT/DK2020/050336, dated Feb. 22, 2021.
China National Intellectual Property Administration, First Notification of Office Action issued in corresponding CN Application No. 202080090542.6, dated Oct. 31, 2022, with English translation, 12 pages.
Japanese Intellectual Property Office, Notice of Reasons for Refusal issued in Japanese Patent Application No. 2022-531015, dated Nov. 29, 2022, with English machine translation.

\* cited by examiner

INSTALLATION OF CABLES AND OTHER COMPONENTS IN A WIND TURBINE TOWER

TECHNICAL FIELD

The present invention relates to a method for installing one or more electric cables in a wind turbine tower section. The present invention further relates to a wind turbine tower section produced using such method and a wind turbine tower comprising such a wind turbine tower section.

BACKGROUND

An important and complex part of the process of installing wind turbine generators is providing all the necessary cables and cable connections that are needed for, e.g., transport of the generated power to the grid, powering operational components and communication between different functional components of the wind turbine generator.

Typically, all cables are installed bottom-up after the full wind turbine tower has been erected. However, with wind turbine generators continuing to grow taller and power production increasing, also the length and weight of the cables running through the tower increases. As a consequence thereof, the installation of these cables gets more and more difficult and expensive. This is especially a problem with offshore wind turbine generators that are difficult to obtain access to and can have wind turbine towers that may, e.g., rise to heights of 80 to 150 m above sea level.

To tackle some of these problems, it is known to install the tower cabling in separate tower sections before those tower sections are transported to their actual location of deployment. After putting all sections on top of each other to assemble a full wind turbine tower, the cables in the separate sections are then connected to each other before starting the operation of the wind turbine generator.

It is an aim of the present invention to further facilitate the installation of electric cables in wind turbine towers.

SUMMARY OF THE INVENTION

According to an aspect of the invention there is provided a new method for installing one or more electric cables in a wind turbine tower section. The method comprises
- providing the wind turbine tower section in a substantially horizontal orientation,
- installing a zip line inside the wind turbine tower section, between a first end and a second end of the wind turbine tower section,
- coupling a second end of the electric cables to the zip line at a location near the first end of the wind turbine tower section,
- drawing the second end of the electric cables through the wind turbine tower section along the zip line,
- decoupling the second end of the electric cables from the zip line,
- anchoring a first end of the electric cables to the wind turbine tower section, at a location adjacent the first end of the wind turbine tower section,
- anchoring the second end of the electric cables to the wind turbine tower section, at a location adjacent the second end of the wind turbine tower section, and
- removing the zip line from the wind turbine tower section.

By temporarily installing a zip line inside the tower section, it is made much easier to draw the cables through the tower sections and install them at the intended location. The zip line itself can then be reused to install cables in other tower sections of the same and other wind turbine towers. It is to be noted that the steps of the method as described here can be performed in the above listed order, but alternative orders may be just as suitable, especially for the last three steps. For example, part of the cables, including the first end, may be connected to the wind turbine tower section before the full cable has been decoupled from the zip line. The second end of the electric cables may be coupled to the zip line, while the zip line is still being installed in the wind turbine tower section and removal of the zip line may start before the cables are connected to the wind turbine tower section. By drawing the cables through the tower sections is herein meant that at least an end of the electrical cables is drawn inside the tower section along at least a portion of the length direction of the tower section.

Because the method is performed with the wind turbine tower section in a substantially horizontal orientation, the installation of the zip line and the connecting of the cables to the tower section much easier. Since the tower sections will typically have a diameter of at least several meters, engineers installing the cabling may be able to walk through the tower section for, e.g., installing the zip line, decoupling the cables and connecting the cables to the tower section. The weight of the full cable may be divided over a number of support points on the zip line, for example using pulley systems as described below. The installation method according to the invention is much safer than classic cable installation in a vertically oriented tower or tower section, wherein the full weight of the cables will typically be suspended in one point, which leads to a risk of substantial damage to equipment and personnel in the unfortunate event that a cable is dropped. In addition thereto, the cable installation method according to the invention can be performed on land at a well-quipped construction facility, before the tower sections are transported to the eventual, possibly offshore, location where the wind turbine is deployed.

After drawing the second end of the electric cables through the wind turbine tower section, the electric cables may be secured to an inside of the wind turbine tower section at one or more locations between the first and second ends of the electric cables. This will help to ensure that the cables remain in position during the transport and deployment of the wind turbine tower sections and prevents damage to the cables and other parts of the wind turbine tower sections. Anchoring the first or second end of the electric cables to the wind turbine tower section may comprise fixedly connecting the respective end to a cable end connector provided in the tower section. Additional cable connectors may be provided in the wind turbine tower section for connecting any cable portion between the first and second end.

In order to further facilitate the installation of the electric cables, the method according to the invention may further comprise a step of installing cable guides for guiding the electric cables while being drawn through the wind turbine tower section. Such cable guides may be installed inside the wind turbine tower section as well as outside the wind turbine tower section, adjacent the first end of the wind turbine tower section. Such guidance is especially useful at locations where the cables have to change direction or need to be safely separated from other components of the wind turbine tower sections. When the electric cables are fully installed, or at least have been brought into their final position, the cable guides can be removed from the wind turbine tower section.

In a special embodiment, the second end of the electric cables is anchored at a radial position near an inner surface of an outer wall of the tower section, and the first end of the electric cables is anchored at a radial position near a centre of the wind turbine tower section. For this embodiment a cable guide may be configured to guide the electric cables from a more central radial position towards a lower and radially more outward position near an inner surface of an outer wall of the tower section. This cable guide may comprise an upswing section configured to bring the electric cables closer to the zip line, and a downswing section configured to lead the electric cables towards the lower and radially more outward position near the inner surface of the outer wall of the tower section. In one embodiment, the electrical cables are released from being supported by the zip line (for example via a pulley) when passing the upswing section of the cable guide.

To avoid having to draw every single cable through the wind turbine tower separately, the method according to the invention may further comprise a step of creating a bundle of the electric cables and the coupling of the second end of the electrical cables to the zip line may be realised by coupling a second end of the bundle to the zip line. The bundling may be done using simple cable ties or with special cable bundle supports that are designed for that purpose. The coupling of the bundle to the zip line may be realised by coupling the cable tie or cable bundle support to the zip line. When the cables have been drawn into their final position, the cable ties or cable bundle supports may either be removed for individually anchoring each electric bundle to the wind turbine tower section or the bundle may be connected to the wind turbine section in its entirety. For example, the cable bundle supports may comprise dedicated engagement features that are configured to enable an easy and firm connection between the cable bundle support and the wind turbine tower section.

Instead of or in addition to using cable guides for facilitating drawing the cables through the tower section, the method according to the invention may comprise coupling the electric cables to the zip line at one or more locations between the first end and the second end of the electric cables, while drawing the second end of the electric cables through the wind turbine tower section. Such coupling may, e.g., be established via a pulley system, wherein a running surface of one or more pulleys is configured to roll over the zip line. This will allow the electric cables to be pulled through the tower section without touching and possibly damaging any other elements other than, e.g., cable guides and will also require far less effort than dragging the cables over the inner surface of the wind turbine tower section. It is to be noted that 'while drawing the second end of the electric cables through the wind turbine tower section' does not necessarily mean that the cables are moving towards the bottom end of the tower section while they are being coupled to the zip line. The drawing of the cables through the tower section will typically be a stepwise process. After having moved the cables over some distance, the moving may be paused and an additional coupling to the zip line is realised before the moving is resumed.

The one or more electric cables may include, e.g., a DC power production cable, an internal power supply cable, and a communication cable.

According to a further aspect of the invention, a method is provided for transporting one or more wind turbine components through at least a portion of a wind turbine tower section. The method comprises providing the wind turbine tower section in a substantially horizontal orientation and installing a zip line inside the wind turbine tower section, between a first end and a second end of the wind turbine tower section, The method further comprises coupling the one or more wind turbine components to the zip line at a location near the first end of the wind turbine tower section, drawing the one or more wind turbine components through at least a portion of the wind turbine tower section along the zip line, decoupling the one or more wind turbine components from the zip line, and removing the zip line from the wind turbine tower section. Wind turbine components, other than electric cables, that may be transported through at least a portion of the wind turbine tower section in this way may include functional wind turbine components, power electronics, cabinets, platform parts, brackets or other members to be secured to the tower wall or lighting. All such components may eventually be part of the functioning wind turbine or may only be needed inside the wind turbine tower section during the preparation and installation stages of the wind turbine construction process.

According to yet a further aspect of the invention, a wind turbine tower section is provided, the wind turbine tower section having been produced using the method as described above. Also a wind turbine tower comprising at least one such wind turbine tower section is considered to form part of the invention.

BRIEF DESCRIPTION OF THE DRAWINGS

Embodiments of the invention will now be described by way of example with reference to the accompanying drawings, in which.

DETAILED DESCRIPTION

Figure 1:
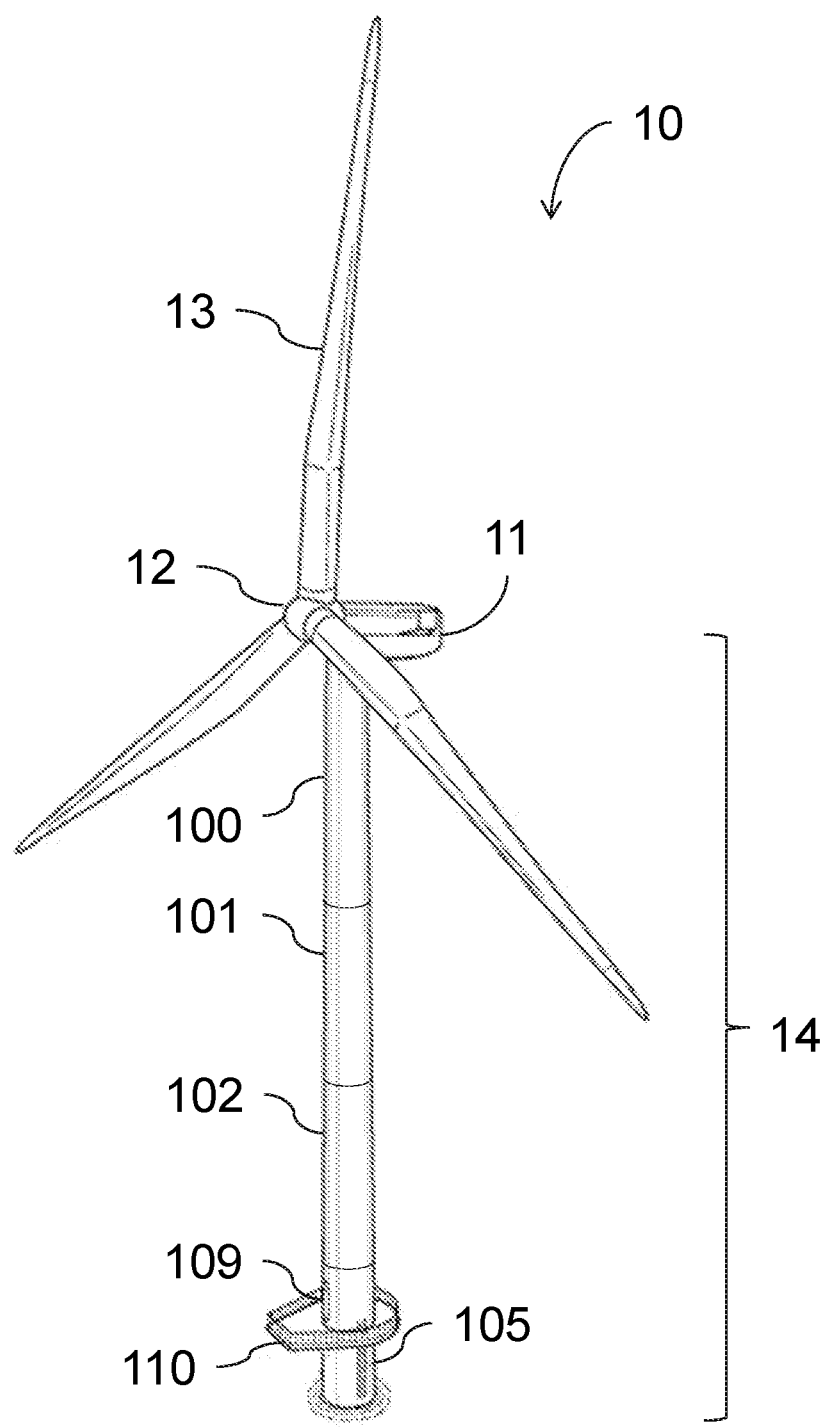
FIG. 1 schematically shows a wind turbine that may be built in accordance with the method according to the invention.

FIG. 1 schematically shows a example of a wind turbine 10 that may be built in accordance with the method according to the invention. The wind turbine 10 shown here is an off shore wind turbine 10, but the invention is equally applicable to the construction of on shore wind turbines. The wind turbine 10 comprises three rotor blades 13 that are connected to a rotor hub 12 and configured to rotate when the wind is blowing sufficiently hard and from the right direction. The rotor hub 12 is rotatably mounted to a nacelle 11 which is placed on top of a wind turbine tower 14. The wind turbine 10 will typically be equipped to yaw the nacelle 11 in order to move the rotor blades 13 in dependence of the current local wind direction. In the nacelle 11, a generator is coupled to the rotor hub for generating converting the kinetic energy of the rotating rotor blades 13 into electrical power.

The wind turbine tower 14 of this wind turbine 10 is made of multiple wind turbine tower sections 100-102 that are installed on top of a so-called transition piece 105. Typically, the wind turbine tower 14 has two to four tower sections 100-102 wherein cables need to be installed. The transition piece 105 is supported by an under water tower foundation. The transition piece 105 comprises a platform 110 and a door 109 for allowing installation and maintenance workers to easily access the tower 14. In an operational wind turbine 10, many electric cables run through the tower 14. The biggest cables are used for transporting the generated power to the grid. Other cables are, e.g., for powering operational components and communication between different functional components of the wind turbine generator.

Often, such cables are installed bottom-up after the full wind turbine tower 14 has been erected and the nacelle 11 is installed on top of the tower 14. Alternatively, some or all of the cables are already installed in the separate tower sections 100-102, before these tower sections 100-102 are transported to the location where the wind turbine generator 10 is installed. This brings the advantage that the installation of the cables can take place on land with the tower section 100-102 in a horizontal position. After installing the tower sections 100-102 on top of each other, the cables of subsequent sections are then connected as needed. With reference to FIGS. 2 to 12, a new and improved method for installing cables into a wind turbine tower section 100-102 and exemplified for wind turbine tower section 100 is described in detail. It is to be noted that the installation method illustrated by the drawings and described below is just one possible way of installing cables in accordance with the method of the invention.

Figure 2:
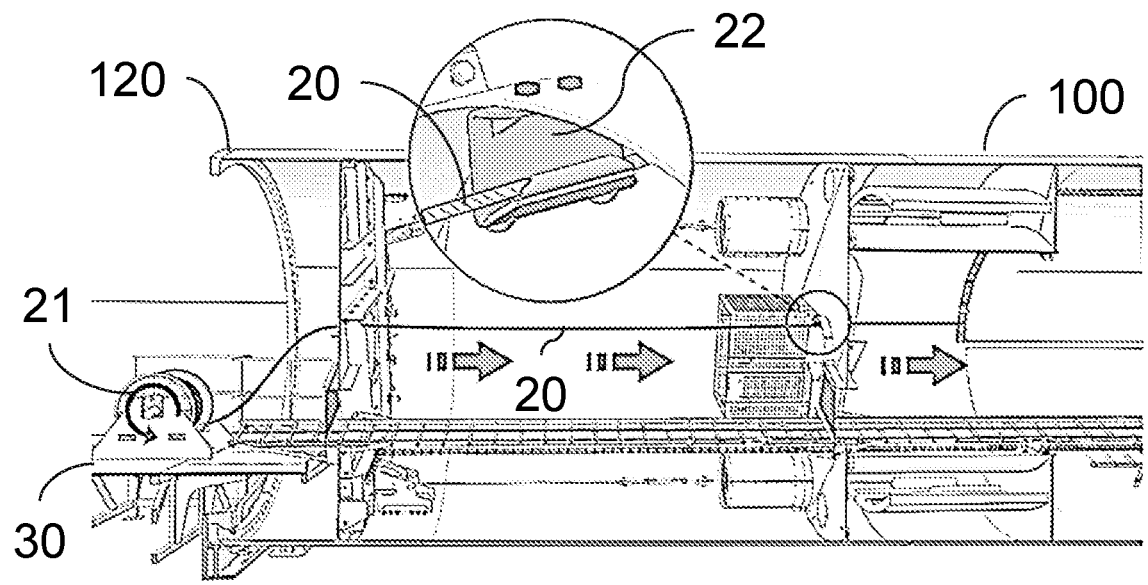
FIG. 2 schematically shows a cross section of a wind turbine tower section and the installation of a zip line.

FIG. 2 schematically shows a cross section of a wind turbine tower section 100 and the installation of a zip line 20. In this example, the zip line 20 is a steel wire or a high strength polymer cable coming from a reel 21 that is put on an installation platform 30 that is built at the top end 120 of the wind turbine tower section 100. It is noted that throughout this description, the terms top end and bottom end will be used for distinguishing two ends of the tower section 100 and other objects. Because the electric cables are preferably installed with the tower section 100 in a substantially horizontal orientation, the terms top end and bottom end refer to the relative position of the two ends after the tower section 100 is brought into its eventual vertical orientation to form part of the wind turbine tower 14.

The zip line 20 is drawn from the reel 21 and through the wind turbine tower section 100 by an installation engineer (in the direction of the arrows). Optionally, support brackets 22 are provided at multiple locations inside the wind turbine tower section 100 for supporting the zip line 20 so the load of the electrical cables carried by the zip line 20 during drawing of the electrical cable is distributed to the tower wall along the length of the turbine tower section 100. It is preferred that the support brackets 22 are of a type that allows pulleys to pass the support bracket 22 without having to be disconnected from the zip line. When the installation of the electrical cables 60 is completed, such support brackets 22 may be removed and reused for installing electrical cables 60 in other wind turbine tower sections 100.

Figure 3:
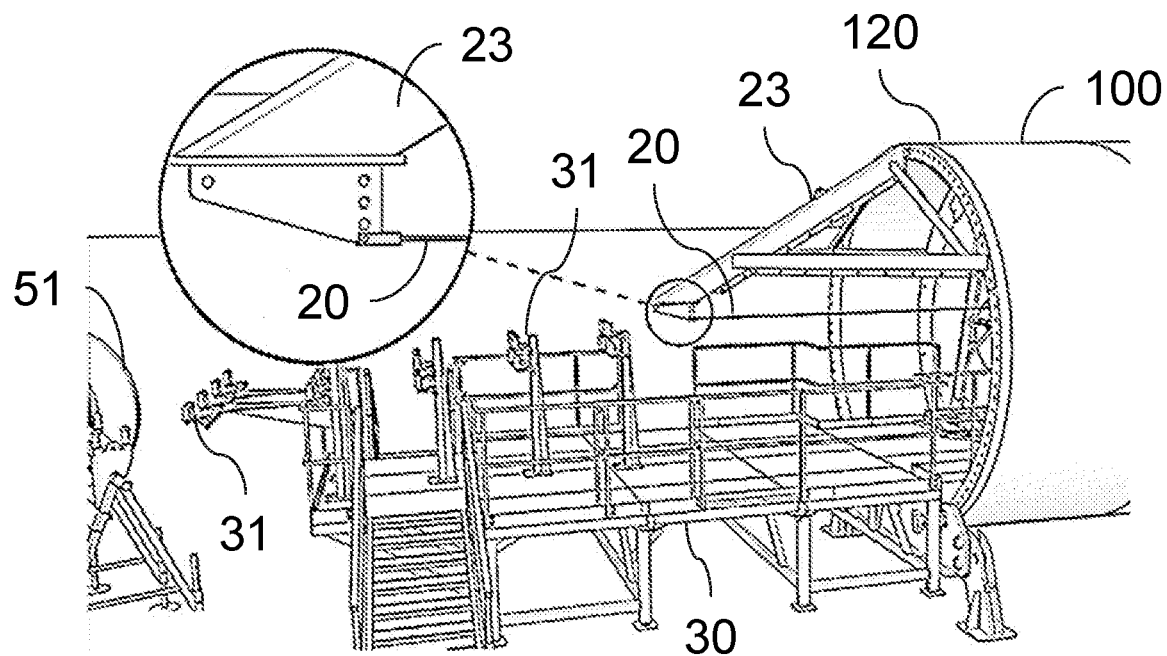
FIG. 3 schematically shows the anchoring of the zip line at the top end of the wind turbine tower section.

FIG. 3 schematically shows an example of the anchoring of the zip line 20 at the top end 120 of the wind turbine tower section 100. For this purpose, a temporary zip line support frame 23 may be mounted to the wind turbine tower section's top end 120. An end of the zip line 20 is securely attached to a part of the support frame 23. Also shown in this figure are the installation platform 30 and a number of cable support guides 31 that will be described in more detail later. A reel 51 with one of the cables to be installed in the wind turbine tower section 100 is placed in front of the installation platform 30.

Figure 4:
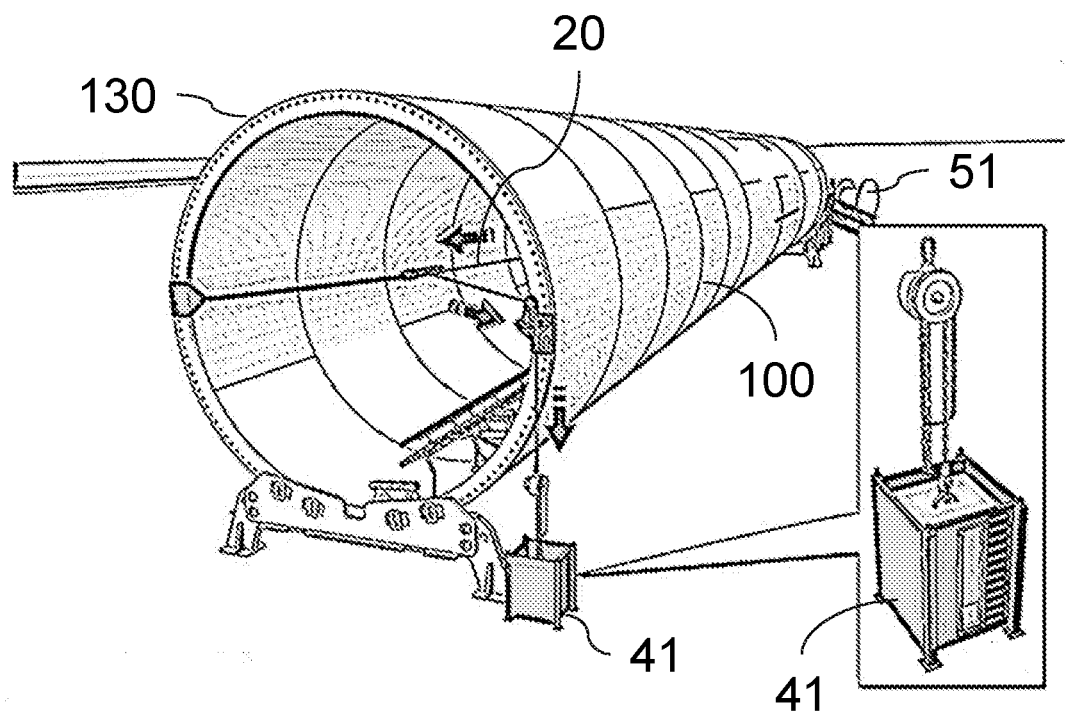
FIG. 4 schematically shows the anchoring of the zip line at the bottom end of the wind turbine tower section.

FIG. 4 schematically shows an example of the anchoring of the other end of the zip line 20 at the bottom end 130 of the wind turbine tower section 100. At this end 130, the zip line 20 is attached to a large counterweight 41 that keeps the zip line 20 under tension.

Figure 5:
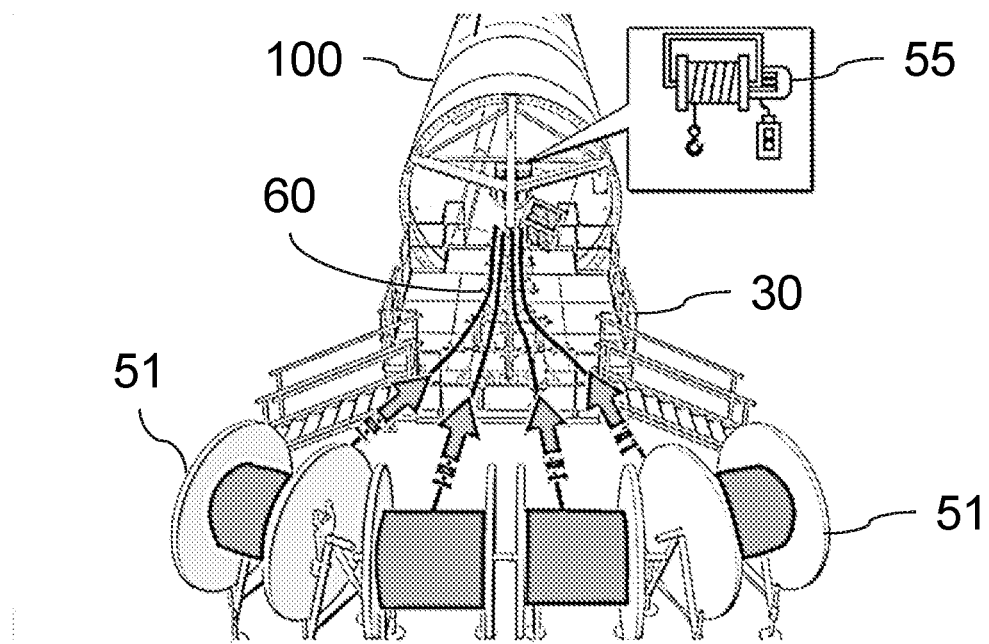
FIG. 5 schematically shows the preparation of four electric cables for being installed inside the wind turbine tower section.

FIG. 5 schematically shows the preparation of four electric cables 60 for being installed inside the wind turbine tower section 100. Each cable 60 is provided on a reel 51 that is placed in front of the top end 120 of the installation platform 30. The cables 60 installed in this exemplary method may, e.g., be DC power cables 60 that in the operational wind turbine 10 may run from an AC/DC converter in the nacelle 11 all the way down to the bottom of the tower 14. Because such cables 60 can be large and heavy, a winch 55 may be used for bringing the cable ends in a position close to the top end 120 of the wind turbine tower section 100. Cable guides 31 (better visible in FIG. 3) may be provided on the installation platform 30 to support the cables 60 while rolling from the reels 51 towards tower section 100. Preferably, such cable guides 31 comprise rollers for facilitating the cable movement.

Figure 6:
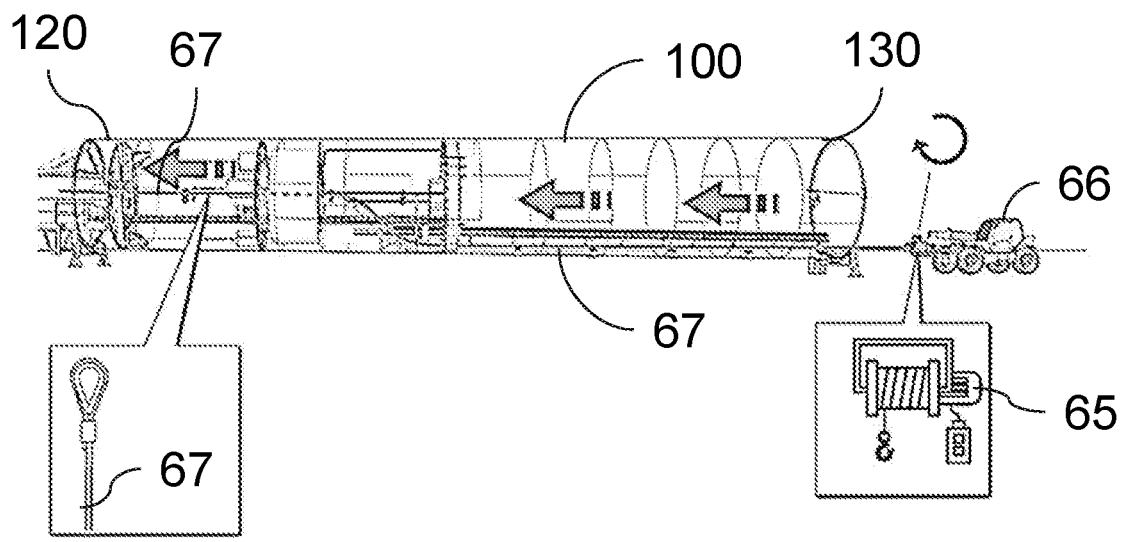
FIG. 6 schematically shows the insertion of a pull chord into the wind turbine tower section.

FIG. 6 schematically shows the insertion of a pull chord 67 into the wind turbine tower section 130. The pull chord 67 may be provided on a winch 65 that is carried and powered by a work vehicle, such as a telehandler 66. While unrolling the pull chord 67, an installation engineer may draw the pull chord 67 through the wind turbine tower section 100 in the direction of the arrows. At the top end 120 of the tower section 100, the pull chord is then connected to one or more of the electric cables 60 that need to be installed.

Figure 7:
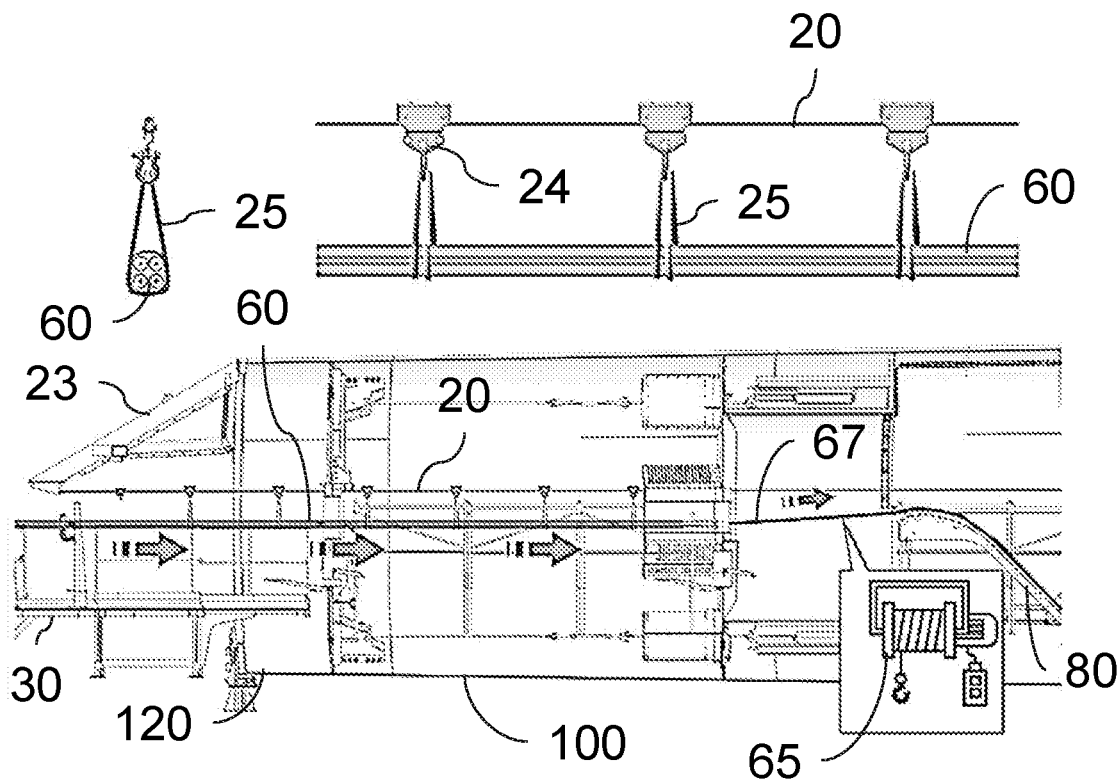
FIG. 7 schematically shows the electric cables being pulled through the wind turbine tower section.

FIG. 7 schematically shows the electric cables 60 being pulled through the wind turbine tower section 100. In this example, four electric cables 60 are bundled and together pulled from the top end 120 to the bottom end 130 of the wind turbine tower section 100 (in the direction of the arrows). To enable pulling the cables 60 through the tower section 100, the cables 60 are not only connected to the pull chord 67, the cables 60 are also coupled to the zip line 20. This may, as shown in the drawing, be done using a sling 25 that is attached to a pulley system 24 that is configured to run along the zip line 20. The coupling of the cables 60 to the zip line 20 is preferably done at a position close to the top end of the zip line 20. While the cables 60 are pulled through the tower section 100, new slings 25 and pulley systems 24 are coupled to the cables 60. Coupling of the electric cables 60 to the zip line 20 may be done at regular intervals of, e.g., 1-2 m.

It is noted that the same zip line 20 can also be used for transporting wind turbine components, other than electric cables 60, through at least a portion of the wind turbine tower section 100. Also the pulley systems 24 described above can be used for such transport. Other wind turbine components that may, e.g., be transported like this may include functional wind turbine components, power electronics, cabinets, platform parts, brackets, ladders or other members to be secured to the tower wall or lighting. All such components may eventually be part of the functioning wind turbine or may only be needed inside the wind turbine tower section 100 during the preparation and installation stages of the wind turbine construction process.

Figure 8:
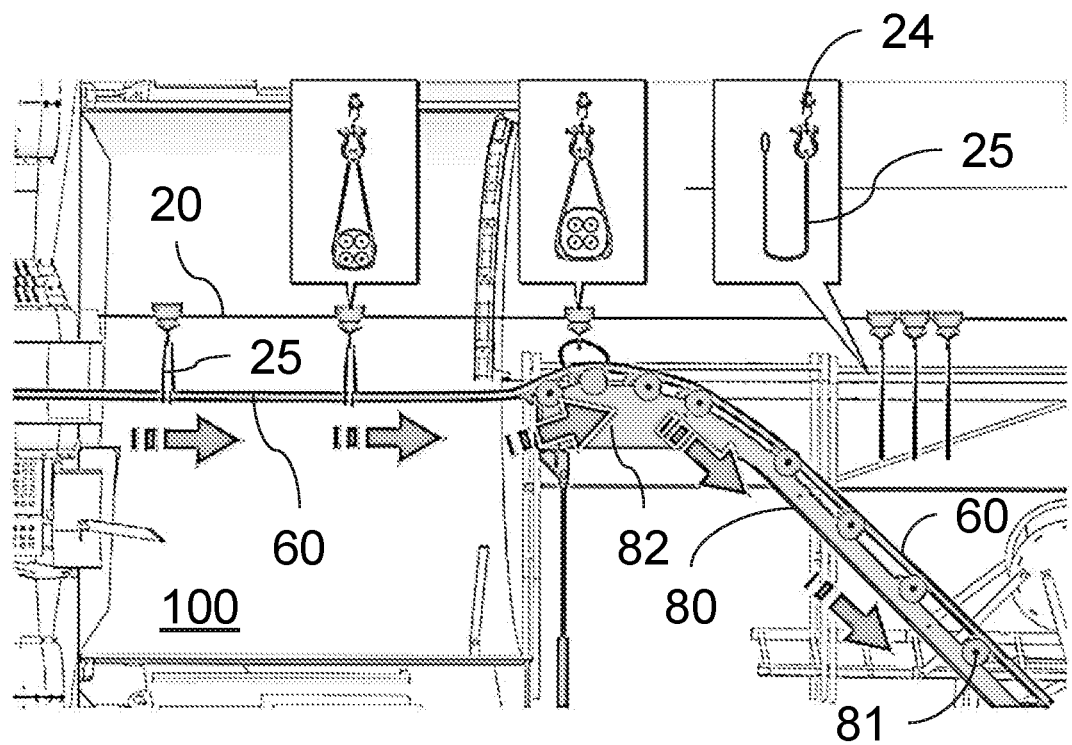
FIG. 8 schematically shows a possible way to divert the electric cables, while pulling them through the wind turbine tower section.

Also shown in FIG. 7 is a cable guide 80 that is used for diverting the cables 60 while being pulled through the tower section 100. This may, e.g., be useful when cables 60 have to be guided around obstacles inside the tower section 100. FIG. 8 shows the cable diversion process in more detail. The cable guide 80 is used to divert the cables 60 from a trajectory through a central part of the tower section 100 towards a trajectory adjacent the inner wall of tower section 100. When being drawn through this part of the tower section 100, the cables are preferably supported by and move over the upper surface of this cable guide 80. Rollers 81 are provided for reducing friction between the cable guide surface and the cables 60. At the top end of the cable guide 80, a little upswing section 82 brings the cables 60 a little closer to the zip line 20. As a result thereof, the cable guide 80 takes of the supporting role of the sling 25 and the sling 25 will loosen. At that point, the sling 25 or the cables 60 may easily be decoupled from the pulley system 24. From the top of the upswing section 82, the cable guide 80 curves downward, leading the cables 60 towards the tower section wall. Since, from thereon, the cables 60 are not anymore directly supported by the zip line 20, additional rollers 84 (see FIG. 9) are provided for supporting and guiding the cables 60 for the remaining part of their travel towards their final destination.

Figure 9:
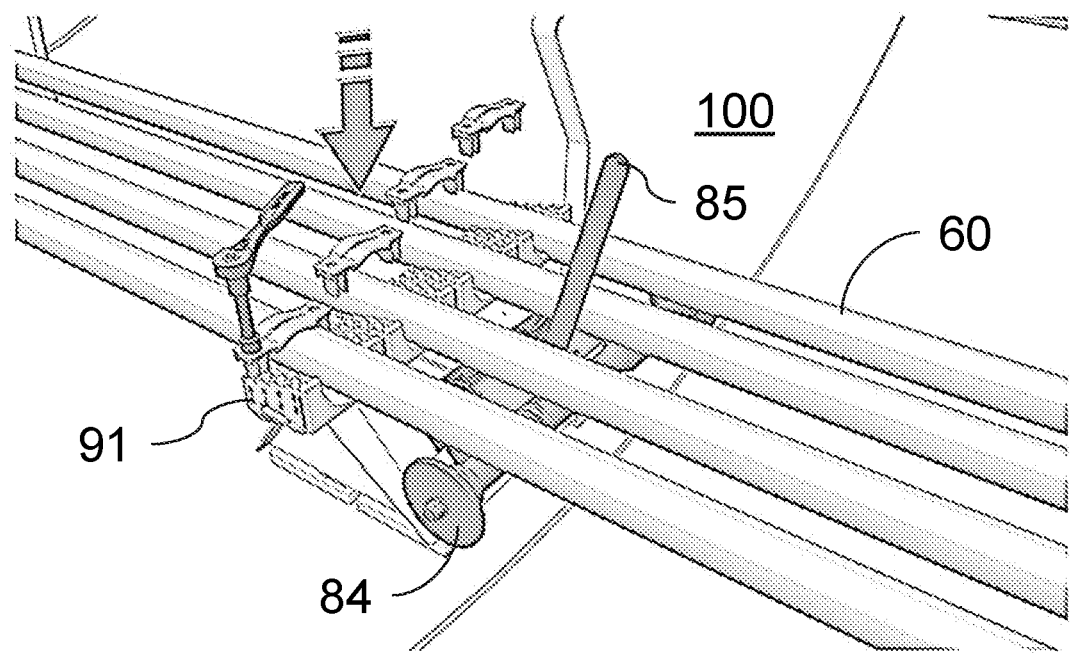
FIG. 9 schematically shows a first way of connecting the electric cables to the inside of the wind turbine tower section.

FIG. 9 schematically shows a first way of connecting the electric cables 60 to the inside of the wind turbine tower section 100. The cable guiding rollers 84 are adjustable in height by the actuation of a lever 85. While the cables 60 are pulled through the tower section 100, the rollers 84 are in a higher position. When the cables 60 have reached their final position, the lever 85 is pulled and the rollers 84 move into a lower position. As a result, the cables 60 that were previously supported by the rollers 84 are lowered too and fall into a series of connectors 91. The connectors 91 are then closed to secure the cables 60 to the tower section wall. This height adjustment system for the rollers 84 brings the advantage that the cables 60 do not have to be drawn through the connectors 91, but will move over them and only get into contact with the connectors 91, when the cables 60 are in their final position and ready to be secured to the tower section wall.

When simultaneously drawing multiple cables 60 through the wind turbine tower section 100, it may be preferred to structurally bundle the cables together before pulling them through the tower section. The bundling may, e.g., be done using simple cable ties or with special cable bundle supports designed for this task. The cable bundling ensures that all cables 60 in the bundle are kept parallel and together while being pulled through the tower section. The coupling of the bundle to the zip line 20 may be realised in a position between two cable bundle supports and with the same sling 25 and pulley system 24 as shown in FIG. 7. Alternatively, the cable ties or cable bundle supports are directly coupled to the pulley system 24.

The cables 60 are preferably bundled when at the top end entrance of the tower section 100 and at regular distances of, e.g., about 0.5-3 m, preferably 0.75-2 m. If, like in FIGS. 7 and 8, the cables 60 are meant to be brought in a different relative orientation in a second downstream portion of the tower section, the cable bundle may be undone just before the cables reach the cable guide 80 shown in those figures. Alternatively, the cable ties or cable bundle supports may not be attached to the first part of the cable bundle at all, such that all cable ties or cable bundle supports that are used will remain upstream of that cable guide 80.

When the cables 60 have been installed, the zip line 20, support brackets 22 and the zip line support frame 23 may be removed from the wind turbine tower section 100. Also the cable guides 80, 84, installation platform 30 and any scaffolding or other tools inside the wind turbine tower section 100 that are only needed for the installation of the cables 60, and not for the transport or deployment of the tower section 100, may be removed. The zip line 20 and all other tools thus removed can then be reused for installing cables in other tower sections 101, and 102.

The invention claimed is:

1. A method for installing one or more electric cables in a wind turbine tower section, the method comprising:
   providing the wind turbine tower section in a substantially horizontal orientation,
   installing a zip line inside the wind turbine tower section, between a first end and a second end of the wind turbine tower section,
   coupling a second end of the electric cables to the zip line at a location near the first end of the wind turbine tower section,
   drawing the second end of the electric cables through the wind turbine tower section along the zip line,
   decoupling the second end of the electric cables from the zip line,
   anchoring a first end of the electric cables to the wind turbine tower section, at a location adjacent the first end of the wind turbine tower section,
   anchoring the second end of the electric cables to the wind turbine tower section, at a location adjacent the second end of the wind turbine tower section, and
   removing the zip line from the wind turbine tower section.

2. The method as claimed in claim 1, further comprising a step of, after the drawing of the second end of the electric cables through the wind turbine tower section, anchoring the electric cables to an inside of the wind turbine tower section at one or more locations between the first and second ends of the electric cables.

3. The method as claimed in claim 1, wherein anchoring the first and/or the second end of the electric cables to the wind turbine tower section comprises fixedly connecting the respective end to a cable end connector provided in the tower section.

4. The method as claimed in claim 1, wherein the second end of the electric cables is anchored at a radial position near an inner surface of an outer wall of the tower section, and wherein the first end of the electric cables is anchored at a radial position near a centre of the wind turbine tower section.

5. The method as claimed in claim 1, further comprising a step of installing cable guides inside the wind turbine tower section for guiding the electric cables while being drawn through the wind turbine tower section.

6. The method as claimed claim 5, wherein the cable guide is configured to guide the electric cables from a more central radial position towards a lower and radially more outward position near an inner surface of an outer wall of the tower section, the cable guide comprising an upswing section configured to bring the electric cables closer to the zip line, and a downswing section configured to lead the electric cables towards the lower and radially more outward position near the inner surface of the outer wall of the tower section.

7. The method as claimed in claim 5, further comprising a step of removing the cable guides from the wind turbine tower section after drawing the electric cables through the wind turbine tower section.

8. The method as claimed in claim 1, further comprising a step of creating a bundle of the electric cables and wherein the coupling of the second end of the electrical cables to the zip line is realised by coupling a second end of the bundle to the zip line.

9. The method as claimed in claim 1, further comprising a step of providing cable guides outside the wind turbine tower section, adjacent the first end of the wind turbine tower section, for guiding the electric cables while being drawn through the wind turbine tower section.

10. The method as claimed in claim 1, further comprising coupling the electric cables to the zip line at one or more locations between the first end and the second end of the electric cables, while drawing the second end of the electric cables through the wind turbine tower section.

11. The method as claimed in claim 1, wherein the coupling of the electric cables to zip line is established via a pulley system.

12. The method as claimed in claim 1, wherein the one or more electric cables include at least one of the following:
- a DC power production cable,
- an internal power supply cable, and
- a communication cable.

13. A wind turbine tower section produced using the method of claim 1.

14. The wind turbine tower comprising at least one wind turbine tower section as claimed in claim 13.

15. The wind turbine comprising a wind turbine tower as claimed in claim 14.

16. A method for transporting one or more wind turbine components through at least a portion of a wind turbine tower section, the method comprising:
- providing the wind turbine tower section in a substantially horizontal orientation,
- installing a zip line inside the wind turbine tower section, between a first end and a second end of the wind turbine tower section,
- coupling the one or more wind turbine components to the zip line at a location near the first end or the second end of the wind turbine tower section,
- drawing the one or more wind turbine components through at least a portion of the wind turbine tower section along the zip line,
- decoupling the one or more wind turbine components from the zip line, and
- removing the zip line from the wind turbine tower section.

* * * * *